July 17, 1951

H. D. MAY 2,560,974

STRIPPER TYPE COTTON HARVESTER

Filed Dec. 21, 1948

INVENTOR.
Horace D. May
BY Victor J. Evans & Co.
ATTORNEYS

July 17, 1951

H. D. MAY 2,560,974

STRIPPER TYPE COTTON HARVESTER

Filed Dec. 21, 1948

INVENTOR.
Horace D. May

BY *Victor J. Evans & Co.*

ATTORNEYS

Patented July 17, 1951

2,560,974

UNITED STATES PATENT OFFICE 2,560,974

STRIPPER TYPE COTTON HARVESTER

Horace D. May, Clovis, N. Mex.

Application December 21, 1948, Serial No. 66,413

1 Claim. (Cl. 56—14)

This invention relates to a harvester, and more particularly to a harvester for cotton.

An object of the invention is to provide a cotton harvester adapted to be attached to a tractor for movement along a row of cotton plants to gather cotton bolls as the harvester is moved and to deliver the bolls to a receptacle or cart carried at the rear of the tractor.

Another object of the invention is to provide a cotton harvester that will strip bolls from upright cotton plants and convey the stripped bolls rearwardly and upwardly to be deposited in a suitable receptacle.

A further object of the invention is to provide a cotton harvester which is extremely simple and inexpensive to manufacture.

Other objects and advantages will be apparent during the course of the following description.

In the accompanying drawings forming a part of this application, and in which like numerals are employed to designate like parts throughout the same:

Figure 6 is a sectional view taken on line 6—6 of Figure 1;

Figure 7 is a fragmentary sectional view taken on line 7—7 of Figure 1;

Figure 8 is a perspective view showing certain constructional details thereof.

Figure 1:
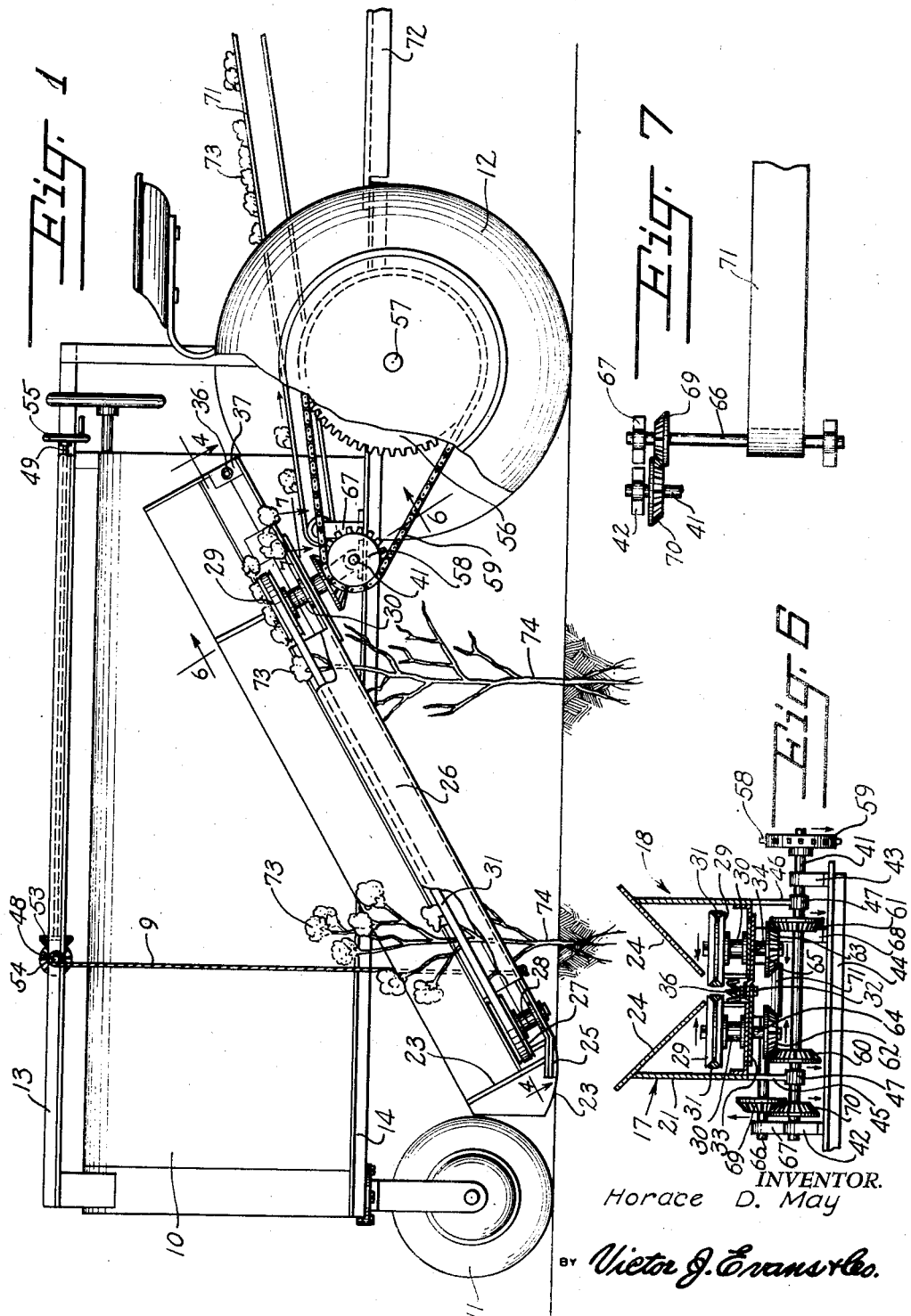
Figure 1 is a view taken on line 1—1 of Figure 2, with parts broken away.

Referring to the drawings, the numeral 10 designates a tractor provided with front wheels 11 and rear wheels 12. Arranged on each side of the tractor and secured thereto is a pair of longitudinally-extending, spaced angle bars 13 and 14. For harvesting the cotton, a cotton stripper unit comprising a pair of spaced elevators 15 and 16 arranged for coaction with each other is mounted on one side of the tractor, and there are a similar pair of spaced elevators 17 and 18 positioned on the other side of the tractor for coacting together. Each of the elevators comprises a bottom wall 19, a side wall 21 extending longitudinally along the side edge of the bottom wall 19 and secured thereto, there being an extension 22 provided with an arcuately-shaped bottom 23 projecting from the forward end of the side wall 21. Projecting vertically from the bottom wall 19 is a skirt 23 for coacting with the side wall 21 to support thereon an inclined top wall 24. Projecting forwardly from the elevator is an upturned shoe 25 for slidable engagement with the ground when cotton is being harvested. Arranged at right angles with respect to a side edge of the bottom wall 19 and secured thereto is a vertically-disposed upright 26 which extends along the bottom wall for a portion of its length. The inclined top walls 24 of the pairs of elevators 15 and 16 are arranged for coaction with each other and define a trough or elongated funnel for conveying bolls of cotton therebetween, as hereinafter described.

Arranged adjacent the front end of each of the elevators is a first grooved pulley 27 rotatably supported on the bearing 28 which projects upwardly from the bottom wall 19. Arranged adjacent the rear of each of the elevators is a second grooved pulley 29 which is rotatably supported by a sleeve 30. Trained over the pulleys 27 and 29 and extending around the exterior of the upright 26 is an endless rubber belt 31.

The pairs of adjacent elevators are pivotally connected by a bolt and nut assembly 32 which extends through a pair of overlapping plates 33 and 34 carried by the bottom walls of the elevator. A coil spring 36 has one of its ends connected to an ear 37 which is secured to the rear end of the elevator 17, while the other end of the spring 36 is connected to an ear 38 that is secured to the rear end of the adjacent elevator 18 for biasing the elevators in proper spaced relation with respect to each other. The inclined top walls 24 are provided with rectangularly-shaped openings 39 which are arranged in registry above a recess 40 in the bottom wall 19 for the ingress therethrough of the bolls being conveyed by the belts 31 of the adjacent coacting pairs of elevators.

Figure 2:
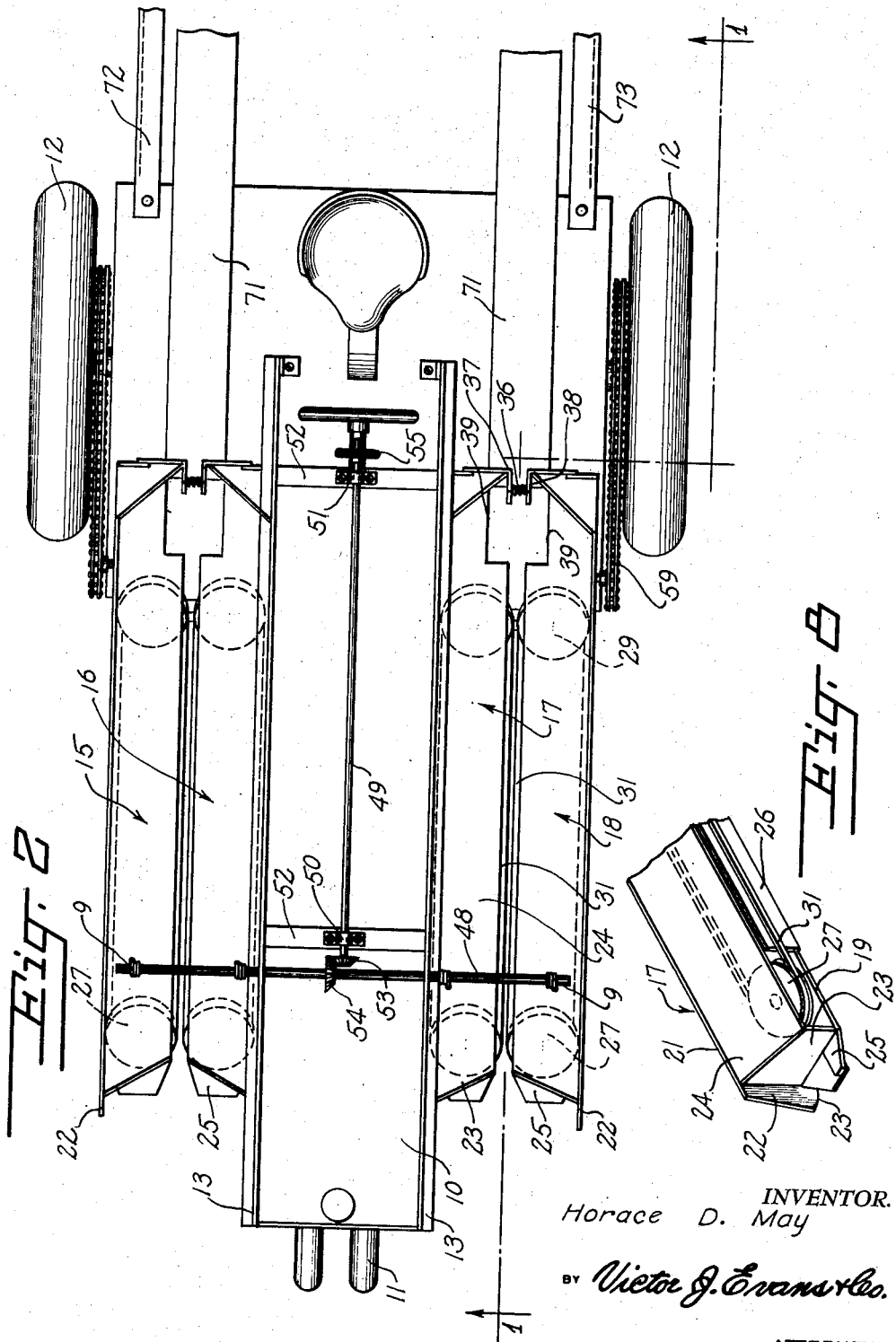
Figure 2 is a top plan view of the cotton harvester attached to a tractor, according to the present invention.
Figure 3:
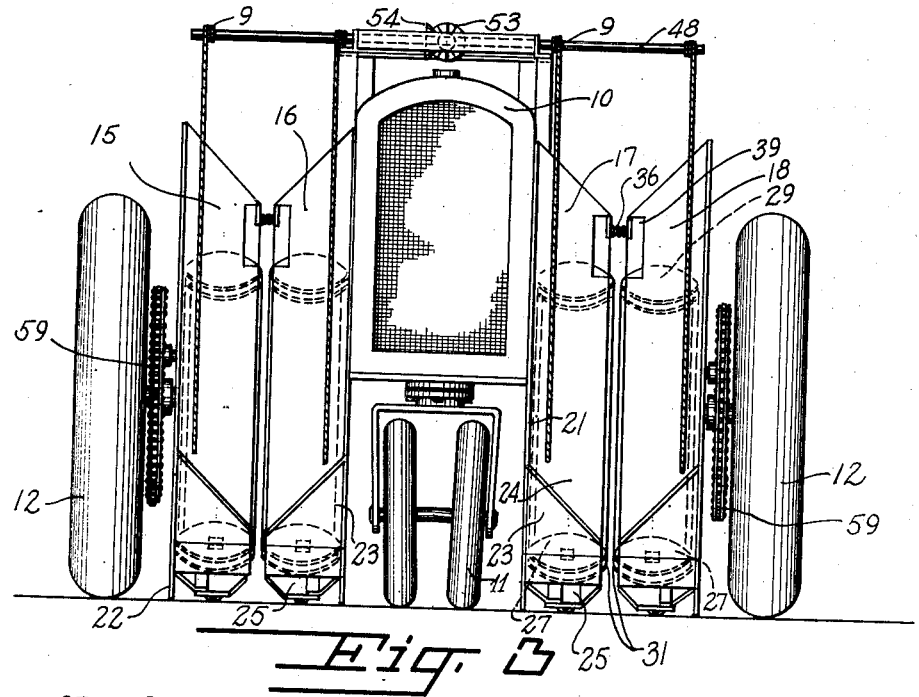
Figure 3 is a front elevational view of the cotton harvester attached to a tractor, according to the present invention.
Figure 4:
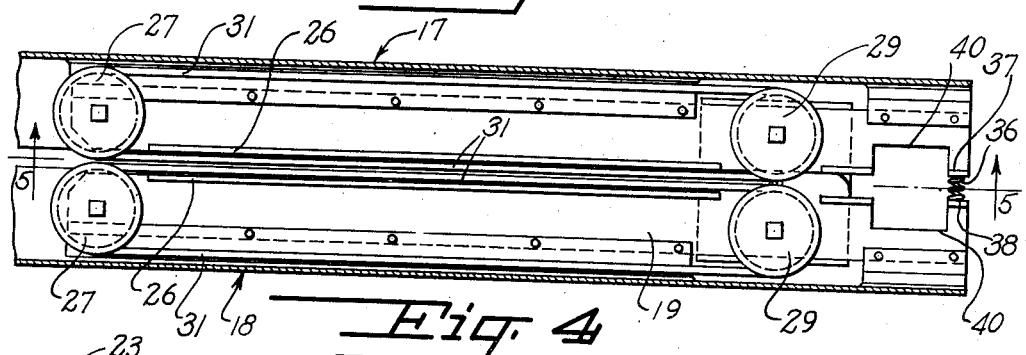
Figure 4 is a sectional view taken on line 4—4 of Figure 1.
Figure 5:
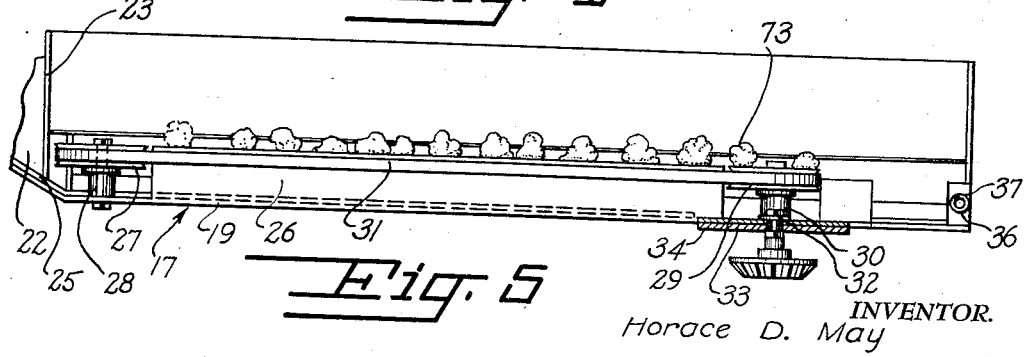
Figure 5 is a sectional view taken on line 5—5 of Figure 4.

The elevators are arranged for pivotal movement about a horizontal axis, so that the front thereof can be conveniently raised or lowered as desired. The pivotal connection embodies a horizontally-disposed rotatable shaft 41 which is supported by a pair of spaced brackets 42 and 43 which project upwardly from the angle irons 44 that extends between the angle irons 14, Figure 6. A pair of spaced arms 45 and 46 extend downwardly from the elevators 17 and 18 and the arms carry collars 47 for rotatably receiving the shaft 41 therein. For causing pivotal movement of the elevators, a rod 48 is arranged transversely above the front of the tractor and the rod carries a plurality of spaced cables 9, which are connected to the bottoms of the elevators for raising and lowering the latter as the rod 48 is rotated, Figure 2. For rotating the rod 48, a longtiudinally-extending rod 49 is rotatably supported on a pair of braces 50 and 51 which project upwardly from angle irons 52. The rod 49 carries a bevel gear 53 arranged in meshing engagement with a bevel gear 54 arranged intermediate the ends of the rod 48, there being a manually-operable wheel 55 on the other end of the rod 49.

The driving mechanism for rotating the grooved pulleys 27 and 29 of the elevators comprises a large sprocket 56 carried by the rear axle 57 of the tractor, there being a small sprocket 58 journaled on the shaft 41, and an endless chain 59 is trained over the sprockets 56 and 58. Arranged in spaced relation on the shaft 41 is a pair of vertically-disposed bevel gears 60 and 61 which are in meshing engagement with a pair of spaced, horizontally-disposed bevel gears 62 and 63, respectively. The bevel gears 62 and 63 are secured to the lower ends of the driven shafts 64 and 65, the shafts 64 and 65 projecting upwardly through the collars 30 and they are secured to the rear grooved pulleys 29 for rotating the latter when the tractor wheels are rotated by the movement of the latter.

A driven shaft 66 is arranged in spaced, parallel relation above and to the rear of the shaft 41 and is rotatably supported on bearings 67 and 68. Carried by the shaft 66 is a bevel gear 69 arranged in working engagement with a bevel gear 70 carried by the shaft 41, Figures 6 and 7. Arranged intermediate the ends of the driven shaft 66 and carried thereby is a broad, endless belt 71 for conveying the bolls of cotton discharged through the recess 40 in the bottoms of the elevators, the bolls of cotton being conveyed to a suitable cart or storage receptacle (not shown). The tractor is provided with a pair of hitches 72 and 73 for attachment to a cart to be towed.

In use, it will be seen that the pair of elevators 15 and 16 coact with each other to harvest or strip bolls of cotton from a row of cotton plants, while the pair of elevators 17 and 18 coact with each other to simultaneously strip an adjacent row of cotton plants. Thus, forward movement of the tractor 10 will rotate the endless chain 59 which is trained over the sprocket 56 carried by the tractor axle 57 and over the sprocket 58 journaled on the shaft 41 to thereby rotate the shaft 41 to rotate the grooved pulleys 29 of the elevators. Rotation of the pulleys 29 causes a rotation of the pair of endless rubber belts 31 which are spaced from each other and coact to strip bolls of cotton 73 from cotton plants 74 as the pairs of adjacent elevators straddle a row of cotton plants, the belts 29 traveling at the same speed as the tractor. The lower ends of the cotton plants will first be stripped as the tractor moves forwardly and then the remainder or upper portions of the cotton plants will be stripped of bolls with the cotton stalks left standing. The stripped bolls are received by the inclined top walls 24 of the elevators and are conveyed rearwardly by the rotary movement of the endless belts 31. As the stripped bolls reach the rear of the elevators, they drop through opening 39 and then through recesses 40 in the bottom wall of the conveyor. The bolls are then deposited on the endless driven belt 71 where they are conveyed rearwardly and deposited in a cart or suitable receptacle (not shown).

By using a properly-selected spring 36, the spacing between adjacent coacting pairs of elevators may be varied, such as when it is desired to vary the spacing in order to conform to varying sizes of cotton rows. For varying the height of the elevators relative to the ground, the operator rotates the hand wheel 55 to thereby wind or unwind the cables 9 to cause a pivotal movement of the elevators.

As many embodiments may be made of this inventive concept, and as many modifications may be made in the embodiment hereinbefore shown and described, it is to be understood that all matter herein is to be interpreted merely as illustrattive and not in a limiting sense.

I claim:

In a cotton harvester, the combination with a tractor having a rear axle, a cotton stripper unit pivotally mounted on said tractor, said cotton stripper unit comprising a pair of spaced coacting elevators, drive means operatively connecting said rear axle to each of said elevators for actuating the latter, each of said elevators comprising a bottom wall, a side wall arranged transversely with respect to said bottom wall and secured thereto, an inclined top wall supported by said side wall, a bearing projecting upwardly from the front end of said bottom wall, a first grooved pulley supported by said bearing, an extension provided with an arcuately shaped bottom projecting from the front end of said side wall, an upturned shoe for slidably engaging the ground, a vertically disposed upright arranged at right angles with respect to a side edge of the bottom wall and secured thereto, a sleeve supported on the rear end of the bottom wall, a second grooved pulley rotatably supported by said sleeve, a rotatable endless belt trained between said first and second pulleys and extending around the exterior of said upright, the endless belts of said pair of elevators cooperating to strip cotton bolls from cotton plants, the inclined top walls of said elevators coacting to define a trough for guiding the stripped cotton bolls rearwardly along said elevators, and means for adjustably moving said elevators about a horizontal axis.

HORACE D. MAY.

REFERENCES CITED

The following references are of record in the file of this patent:

UNITED STATES PATENTS

| Number | Name | Date |
| --- | --- | --- |
| 1,153,968 | Speck | Sept. 21, 1915 |
| 1,722,747 | Hentz | July 30, 1929 |
| 1,769,104 | Benjamin | July 1, 1930 |
| 1,886,151 | Benjamin | Nov. 1, 1932 |
| 2,406,058 | Boone | Aug. 20, 1946 |